March 10, 1964

J. TITTMAN ETAL 3,124,679

NUCLEAR DETERMINATION OF NITROGEN CONTENT

Filed Dec. 4, 1958

INVENTORS.
JAY TITTMAN
WILLIAM B. NELLIGAN
STEPHEN ANTKIW &
FRANK F. JOHNSON

BY Brumbaugh, Free, Graves & Donohue their ATTORNEYS.

March 10, 1964

J. TITTMAN ETAL 3,124,679

NUCLEAR DETERMINATION OF NITROGEN CONTENT

Filed Dec. 4, 1958

INVENTORS.
JAY TITTMAN
WILLIAM B. NELLIGAN
STEPHEN ANTKIW &
FRANK F. JOHNSON

BY Brumbaugh, Free, Graves & Donohue their ATTORNEYS.

March 10, 1964  J. TITTMAN ETAL  3,124,679
NUCLEAR DETERMINATION OF NITROGEN CONTENT
Filed Dec. 4, 1958  3 Sheets-Sheet 3

INVENTORS.
JAY TITTMAN
WILLIAM B. NELLIGAN
STEPHEN ANTKIW &
FRANK F. JOHNSON
BY Brumbaugh, Free, Graves & Donohue
their ATTORNEYS.

United States Patent Office 3,124,679
Patented Mar. 10, 1964

3,124,679
NUCLEAR DETERMINATION OF
NITROGEN CONTENT
Jay Tittman, Danbury, William B. Nelligan, Candlewood Lake, and Stephen Antkiw and Frank F. Johnson, Danbury, Conn., assignors to Schlumberger Well Surveying Corporation, Houston, Tex., a corporation of Texas
Filed Dec. 4, 1958, Ser. No. 778,109
14 Claims. (Cl. 250—43.5)

This invention relates to quantitative determination of the chemical elements in a sample of material and, more particularly, to a system for the determination of the concentrations of these elements by neutron irradiation and the analysis of gamma-rays produced thereby.

It is well known that many of the elements emit gamma-rays as a result of bombardment by neutrons and further that the gamma-ray spectra resulting from such irradiation exhibit properties characteristic of the element.

The technique of using artificially induced radioactivity as a means for chemical analysis has been used heretofore. This has involved the steps of irradiating a sample and thus activating it, followed by observations of the time decay of this artificially induced activity. In many cases, this technique is time-consuming and is limited to certain elements. Furthermore, for many of its most interesting uses, the irradiation intensity required is so large as to require the use of a nuclear reactor, thus making the technique costly and inconvenient.

It is an object of the invention, therefore, to provide new and improved methods and apparatus for determining the concentration of an element in a sample by measurements of gamma-rays produced while the sample is being irradiated with neutrons.

Another object of the invention is to provide a system for determining the concentration of an element in a sample by measuring simultaneously the intensity of gamma-rays of an energy characteristic of the element and the intensity of the flux of neutrons available to enter into such reactions with the element as will produce these gamma-rays.

A further object of the invention is to provide a system for the non-destructive determination of the concentration of an element in a sample in a relatively short time and with relatively high accuracy.

Yet another object of the invention is to provide a system of the above character for determining the nitrogen concentration, for example, of a sample by measurement of the intensity of gamma-rays having an energy characteristic of neutron capture by nitrogen atoms.

Still another object of the invention is to provide a system for making measurements of the above type rapidly and with a high degree of accuracy.

These and other objects of the invention are attained by irradiating the sample to be analyzed with neutrons and detecting the resulting gamma-rays. Those gamma-rays which have energy characteristic of neutron interactions with atoms of the element under analysis are selected from all other radiations and their rate of occurrence is measured. In one embodiment of the invention, a hydrogenous sample is irradiated with high energy neutrons which are thermalized by collisions with hydrogen nuclei in the sample. The thermal neutrons are then captured by the various elements present. At least one detector is positioned to receive gamma-rays resulting from capture of the thermal neutrons and generate pulses having amplitudes related to the energy of each gamma-ray detected. The detector may be suitably shielded from the direct radiation, both neutron and gamma-ray, from the source. In order to prevent spurious indications of high energy gamma-rays by pile-up (in time) of two or more low amplitude pulses, a preselector eliminates substantially all the pulses from the detector generated by gamma-rays having energies below a predetermined value. Pulses resulting from neutron capture by atoms of the element under analysis are selected by a single channel pulse height analyzer and the rate of occurrence is measured. At the same time, another detector measures the intensity in the sample of the thermal neutrons available for inducing the nuclear reaction. This measurement is used to normalize the preceding one so that the concentration determination is independent of the neutron source strength and substantially independent of the presence of other elements which are capable of altering the thermal neutron intensity in the sample.

Further objects and advantages of the invention will be apparent from a reading of the following description in conjunction with the accompanying drawings in which.

Figure 1:
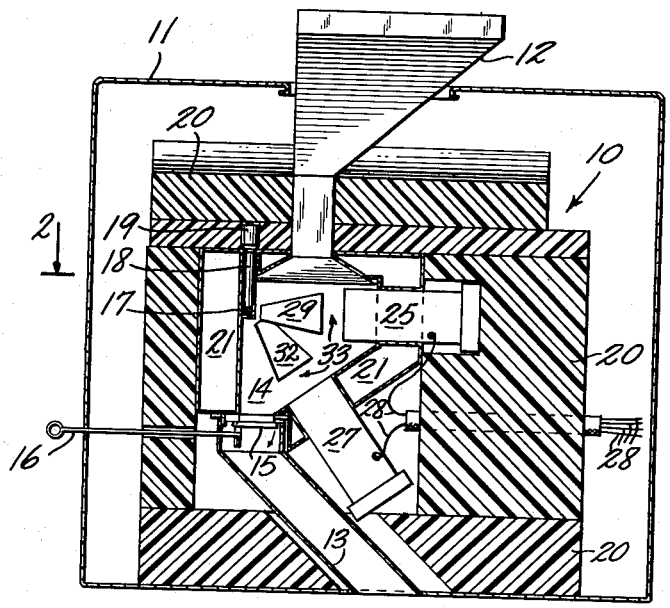
FIG. 1 is an elevation view in section taken through a typical sample holder arranged according to the invention.
Figure 2:
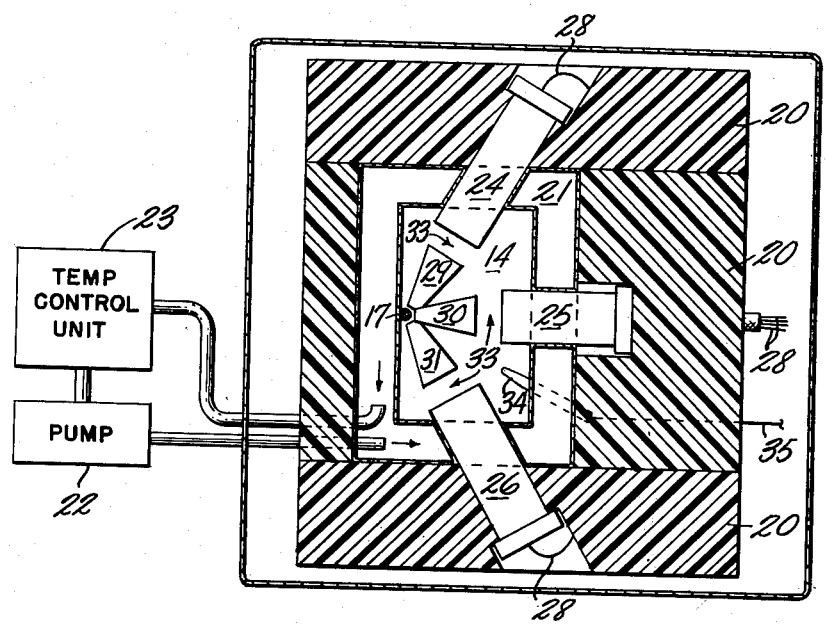
FIG. 2 is a plan view in horizontal section taken through the sample holder of the lines 2—2 of FIG. 1 and looking in the direction of the arrows.

In a representative embodiment of the invention as illustrated in FIGS. 1 and 2, a sample holder 10 is arranged within an enclosure cabinet 11 and includes a loading hopper 12 extending through the top of the cabinet and a removal chute 13 leading out through the bottom. The hopper 12 opens into the top of a sample chamber 14 to permit introduction of a sample therein while at the bottom a trap door 15 is operable from outside the cabinet 11 by a control shaft 16 to empty the contents of the chamber into the removal chute 13.

In order to irradiate a sample deposited in the chamber 14, a source of fast neutrons 17 is positioned against one wall of the chamber in a tube 18 sealed by a stopper 19. Blocks of paraffin 20 or other hydrogenous material are located around the sample chamber in such fashion as to reduce the fast neutron flux emanating from the enclosure 11 to a level which does not constitute a health hazard. Within the paraffin shield, the chamber 14 is enclosed by a water jacket 21 through which water is constantly circulated by a pump 22, the temperature of the water being maintained at a predetermined value in the usual manner by a temperature control unit 23. In addition to its function of maintaining a predetermined temperature, the water in the jacket 21 serves to moderate, or thermalize, neutrons from the source 17 as described below, and to assist the paraffin 20 in shielding personnel.

In order to provide an illustrative description of the apparatus of the invention and its operation, reference will be made hereinafter to measurements of the nitrogen content of a sample of corn meal as a typical example, it being understood that accurate determinations of the content of many elements in many types of sample may be made by the apparatus. Typical illustrations of the applicability of the invention to other elements and samples are nitrogen, sulfur, chlorine, phosphorus, iron, etc., in samples of wheat, flour, fertilizer, explosives, etc. It is readily apparent that with suitable modification of the sample holder 10, liquid samples may also be examined.

When exposed to thermal, or slow, neutrons, the nuclei of most elements capture neutrons and form compound nuclei having atomic weight one unit greater than that of the original nuclei. The probability that a thermal neutron will be captured by a given element in a sample is proportional to the concentration of the element in the sample, the concentration of thermal neutrons in the sample, and the thermal neutron capture cross-section, which is a property of the element and varies from one element to another.

Capture of a thermal neutron by a nucleus in this manner increases the energy of the new compound nucleus by an amount equal to the binding energy of the neutron. In order to return to a stable internal structure, the excited compound nucleus usually emits a gamma-ray photon which carries away the excitation energy or a cascade of gamma-ray photons the sum of whose energies is equal to the excitation energy. This process, called neutron capture gamma-ray emission, leaves the compound nucleus in its lowest, or ground, state. Inasmuch as the neutron binding energy in the compound nucleus is a specific value for each element or isotope, and the manner of de-excitation is also specific, the cascade of gamma-rays which is emitted constitutes a characteristic spectrum for each element (isotope). This spectrum consists of a number of photons of discrete energies, the relative numbers being dependent upon the relative probabilities of different modes of cascade.

Although some of the elements are capable of capturing fast, or high energy neutrons, the capture cross-section varies with the energy of the neutron and, in general, is greatest at thermal energy, i.e. when the motion of the neutron is due solely to thermal agitation. A second type of phenomenon involving fast neutrons is that of inelastic collisions. In these collisions nuclei are excited directly without the permanent incorporation of the neutron into the nucleus. The de-excitation process usually takes place instantly and a characteristic inelastic gamma-ray spectrum is formed by the de-excitation cascade. These spectra may also be utilized for the analysis of specific elements under certain conditions. In the present illustration, however, attention will be directed to the use of thermal neutron capture gamma-rays, as described above. Since the nuclei of an element emit these characteristic gamma-rays in proportion to the concentration of the element and the concentration of thermal neutrons, a quantitative determination of the concentration of an element in a specific volume of a sample can be made by measuring the intensity of the thermal neutrons in the sample and the intensity of the characteristic radiations therefrom.

Excess energy may be released from an excited nucleus by any of several types of radioactive emanations, such as by emission of an alpha particle, a proton or a gamma-ray. By far the most frequent reaction, however, is the emission of a gamma-ray and, because of its greater penetration without loss of energy, content determinations of high accuracy are obtained, and the invention is preferably practiced, by measurement of the intensity of characteristic gamma-rays emitted by nuclei of the element.

According to the invention, therefore, a quantitative determination of the nitrogen content of a sample of corn meal is made by detection of gamma-rays of characteristic energy resulting from neutron capture by nuclei of nitrogen, the protein content being calculated from the percentage of nitrogen in the sample by well known means. In one possible nuclear reaction, capture of a thermal neutron by a nucleus of nitrogen 14 results in the emission of a gamma-ray of 10.8 m.e.v. energy from the nucleus. Although other gamma-rays also result from neutron capture by a nitrogen nucleus and these could be utilized for quantitative determinations, the 10.8 m.e.v. gamma-rays lie in a portion of the spectrum generally free from the presence of gamma-rays representing other elements and for that reason are more readily distinguished from the background and yield greater accuracy of measurement. Selection of this characteristic radiation, however, imposes rigid stability and high sensitivity requirements on the apparatus. These requirements arise from the fact that the 10.8 m.e.v. gamma-rays constitute only a minute proportion (of the order of $10^{-4}$) of total number of gamma-rays detected. In order to accumulate a statistically significant number of them in the desired short measurement time, it is thus necessary that roughly ten of these 10.8 m.e.v. photons be detected per second by each detector. Furthermore, inasmuch as the well-known polonium-beryllium and plutonium-beryllium mixtures produce neutrons without substantial gamma radiation which might interfere with measurements of gamma-rays from the sample, the radiation source 17 utilized in the invention is preferably a preparation of a conventional polonium-beryllium mixture having, for example, a strength of five curies or a mixture of plutonium-beryllium of the same neutron source strength. Moreover, if desired, a neutron pulse source of the type described in copending application of Goodman, Serial No. 441,976, may be utilized. In accordance with the disclosure of said application, improved element detection may be obtained by utilizing as the source 17 a neutron generator arranged for intermittent operation comprising, for example, an ion source, an accelerator, and a suitable neutron-producing target. With this source, the radiation detectors described in detail hereinafter are operated intermittently in suitable phase relation with respect to the operation of the pulse source.

In order to detect gamma-rays emitted by a sample placed in the chamber 14, a conventional scintillation counter may be employed. Preferably, four such detectors 24, 25, 26 and 27 are used in order to increase the total number of 10.8 m.e.v. gamma-rays detected. They project through the water jacket 21 into the chamber so as to receive gamma-rays from the sample. In the typical embodiment of the invention illustrated in FIGS. 1 and 2, three of the detectors 24, 25 and 26 are angularly spaced in a horizontal plane while the fourth detector 27 is positioned below the others at an angle to their plane, as best seen in FIG. 1. Each of the detectors is responsive to gamma-rays, as described hereinafter, to generate a pulse signal substantially proportional to the energy of a detected gamma-ray which is transmitted to analyzing apparatus by a cable 28. In order to diminish actuation of these detectors by high energy neutrons from the source 17, four truncated scattering cones 29, 30, 31 and 32, composed of bismuth or other suitable material of high atomic weight, high density, low thermal neutron capture cross-section, and inocuous capture gamma-ray spectrum, are angularly positioned with their apices directed toward the source and mounted within the chamber at angles corresponding to the positions of the various detectors. These cones are arranged so that the associated crystal in each case is in the "shadow" of the cone.

Between the base of each cone and the corresponding detector a space 33 permits the introduction of a volume of sample material adjacent the sensitive portion of the detector. Although gamma-rays emitted by atoms in other portions of the sample are effective to actuate the detectors, it has been found that a higher ratio of nitrogen counts to background counts is obtained if a substantial volume of sample material is included in each space 33 between the cone and the corresponding detector. Within the bismuth cones, most of the high energy neutrons emitted by the polonium-beryllium source in the direction of the detectors are scattered by collisions with the atoms of bismuth through the sides of the cones into the sample material in the chamber. In this manner, the non-information or background, radiation actuating the detector is substantially reduced and, in a typical structure it was found that only approximately ten percent of the background in the 10.8 m.e.v. region was caused by fast neutrons passing directly through the cones, while roughly eighty percent resulted from fast neutrons scattered into the scintillation detectors by the sample and water jacket, the remaining ten percent being the effect of cosmic rays.

Further collisions of the fast neutrons with low atomic weight nuclei, such as hydrogen, in the sample material and in the water in the jacket 21 absorb energy from the neutrons, thus moderating, or slowing them. Utilization of the water in the jacket 21 to moderate the neutrons in this manner substantially reduces the size of the sample required to obtain accurate measurements. Thus, as a result of collisions in both the sample and the water jacket, substantial numbers of neutrons are reduced to thermal energy and may be captured by the various atoms in the sample in proportion to their relative abundance and thermal neutron capture cross-section. In response to capture of a thermal neutron, the atoms of each element in the sample emit radiation having energy characteristic of the element. Thus, for example, hydrogen atoms may emit 2.2 m.e.v. gamma-rays, while excited nitrogen atoms, as described above, produce, among others, 10.8 m.e.v. gamma-rays. Accordingly, each of the detectors 24, 25, 26 and 27 is actuated by a number of characteristic gamma-rays in intensities dependent upon the abundance of the corresponding element in the sample.

It will be apparent from the above that the flux, or intensity, of the thermal neutrons in the sample, and therefore the number of neutrons capable of being captured by nitrogen atoms, is reduced by the presence of neutron-capturing nuclei. Thus, the intensity of 10.8 m.e.v. gamma-rays characteristic of nitrogen emitted by a sample varies not only as a function of the nitrogen concentration, but also according to the number of hydrogen and other neutron-capturing atoms present. Accordingly, in order to determine the thermal neutron flux to which nitrogen atoms in a sample are subjected, a slow neutron detector 34 is mounted within the chamber at a position where the intensity of the thermal neutrons is substantially representative of an appropriate spatial average taken over the whole sample and indications are transmitted therefrom through a cable 35. The slow neutron detector 34 may, for example, comprise a conventional boron trifluoride counter tube which responds to neutrons in inverse proportion to their velocity and thus is particularly adapted for the detection of thermal neutrons.

With several radiation detectors arranged to respond to gamma-rays from the sample material at the same time, it is possible to obtain spurious indications of high energy gamma-rays by the simultaneous receipt of two or more low energy gamma-rays by the various detectors. Moreover, even if only one detector is utilized it often is impossible for analyzing equipment to distinguish two or more pulses received in very close sequence so that several low energy gamma-rays could be analyzed as a single high energy gamma-ray, for example. Furthermore, each scintillation counter in the apparatus described above responds to approximately 100,000 radiations per second over the entire energy spectrum. This fact requires that the pulses be made extremely narrow to prevent overlapping. As a consequence of the narrowness of the pulses and of the high rate, ordinary high stability amplifiers and pulse height analyzers would be difficult to use.

Figure 3:
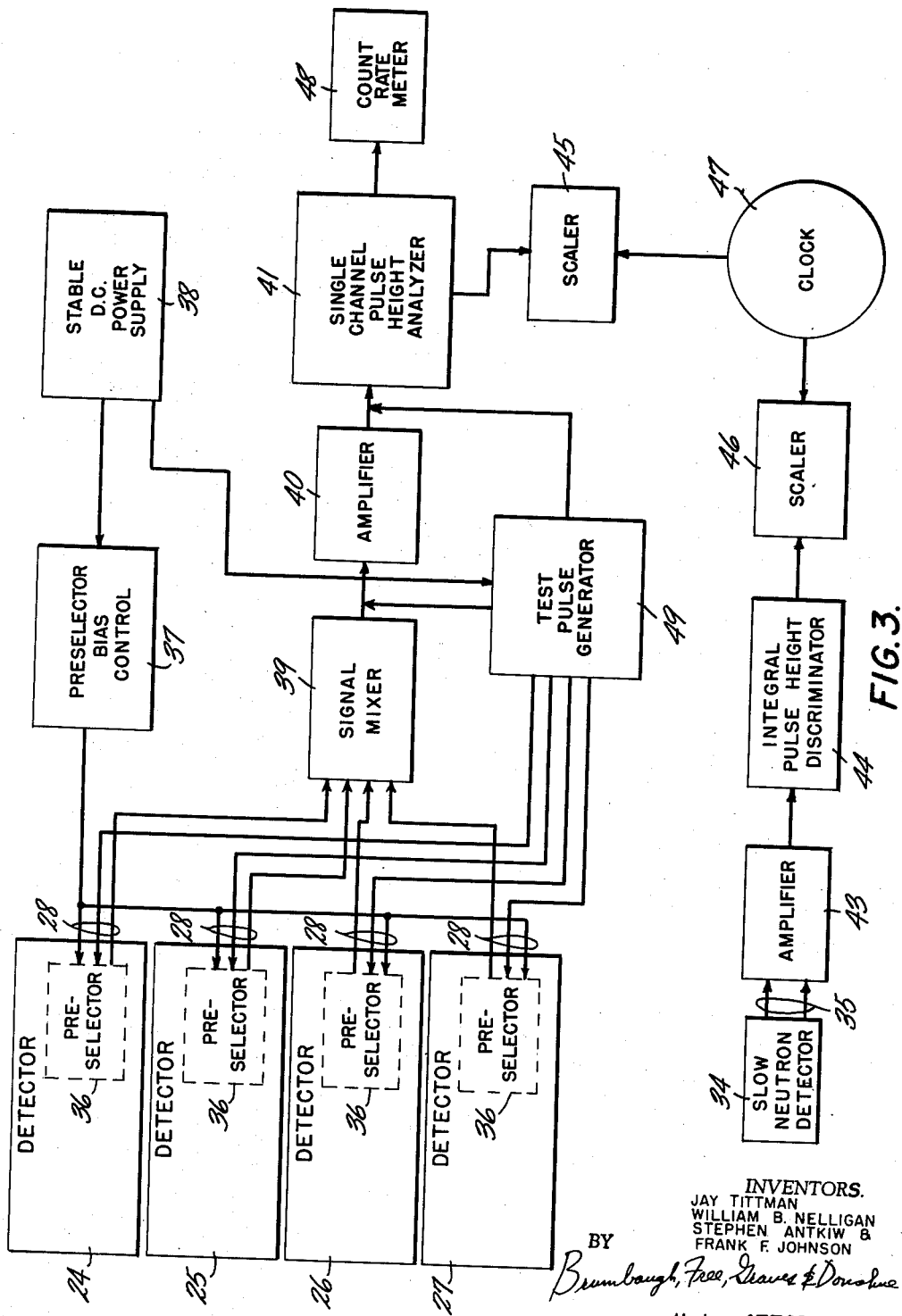
FIG. 3 is a block diagram illustrating schematically a typical electrical system arranged according to the invention.
Figure 4:
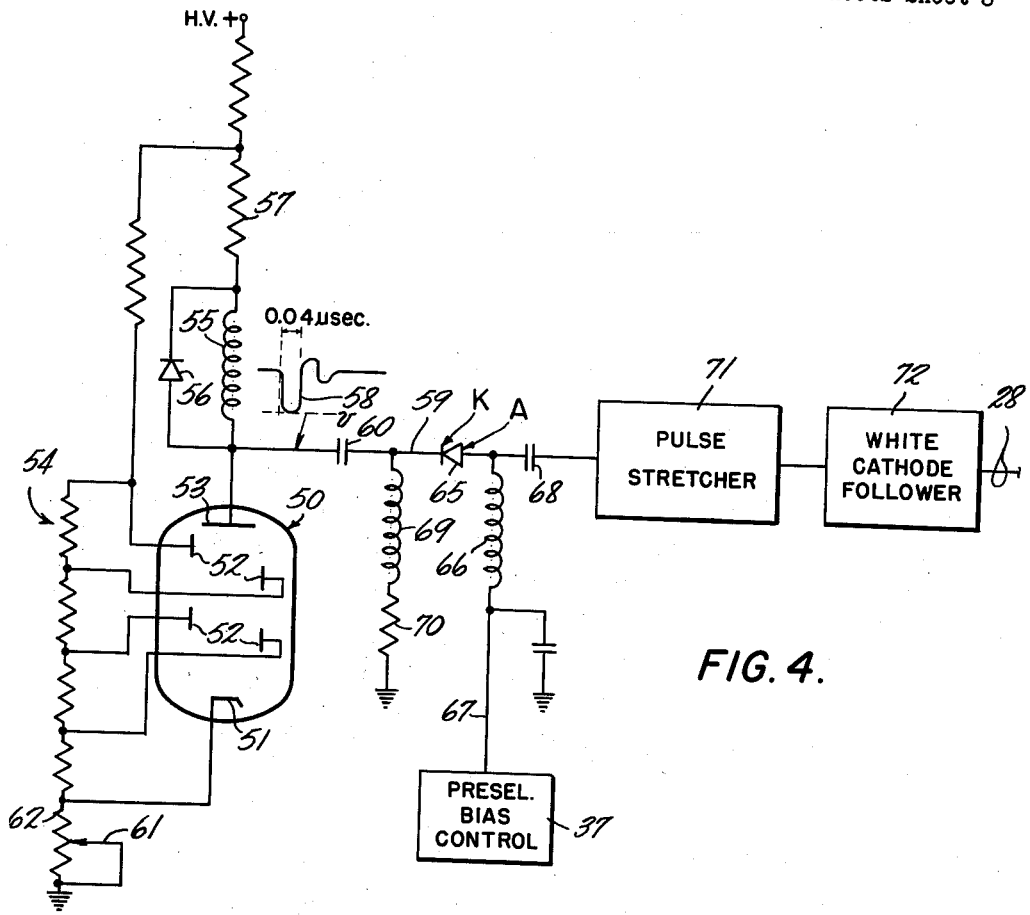
FIG. 4 is a schematic circuit diagram illustrating in detail the arrangement of a portion of the system shown in FIG. 3.

Therefore, as indicated in FIG. 3 and illustrated in detail in FIG. 4, each of the detectors 24–27 includes a preselector 36 which is arranged to block substantially all the pulses having amplitudes less than a selected value determined by a voltage supplied thereto from a preselector bias control 37. This eliminates pulses generated by lower energy gamma-rays so that the spurious indications of high energy radiations described above are prevented. Furthermore, the preselector blocks a large proportion of the counts registered by the corresponding detector, thereby permitting the use of highly stable equipment not capable of operating at high counting rates. Despite the shielding effect of the bismuth cones, a large proportion of the signal pulses produced are the result of high energy neutrons scattered into the scintillators by the sample and water jacket. These pulses dominate the major portion of the pulse height spectrum up to a pulse height equivalent to about 8 m.e.v. and tend to pile up on one another so as to form spurious pulses at the same height as those from the 10.8 m.e.v. gamma-rays. Accordingly, the voltage from the bias control 37 must be set to block a substantial portion of the pulses corresponding to energies below those of interest. In principle, one would block all those pulses below about 9 m.e.v. However, because of stability difficulties, a blocking level at roughly one-half of this energy is reasonable to use. In order to control the bias voltage accurately, the preselector bias control 37 is preferably powered from a highly stable D.C. power supply 38.

Also, as an aid in maintaining stability of the scintillation crystals and photomultipliers utilized in the detectors, the water jacket 21 is preferably arranged so that most of the current drawn by the photomultipliers is due to the pulses caused by energetic neutrons entering the crystals. Thus, the variation in current when the system goes from a "sample in" condition to a "sample out" condition is very small, thereby causing negligible hysteresis effect in the gain of the photomultipliers. This tends to stabilize the operation of the apparatus during periods when no sample is in the chamber and, at the same time, provides a reference background indicative of proper operation of the equipment.

As indicated in FIG. 3, pulse signals passed by the preselectors 36 are combined in the usual manner in a mixer 39 and passed through an amplifier 40 to a conventional single channel pulse height analyzer 41 wherein the pulses corresponding to approximately 10.8 m.e.v. radiations are selected and all other pulses are blocked. Meanwhile, signals from the slow neutron detector 34, indicative of the thermal neutron flux in the sample, are transmitted through the cable 35 and an amplifier 43 to a conventional integral pulse height discriminator 44 set on the neutron detector plateau in the usual fashion. Thus, there is provided an accurate indication of the intensity of thermal neutrons in the sample available for capture by nitrogen atoms.

Two conventional scalers, 45 and 46, are arranged to respond to pulse signals transmitted by the pulse height analyzer 41 and the discriminator 44, respectively. For convenience, both scalers are deactivated simultaneously in response to a signal from a clock 47, so that each accumulates a number proportional to the number of pulses received during a preset time interval. Accordingly, at the end of the time interval the scalers 45 and 46 indicate numbers proportional to the number of 10.8 m.e.v. gamma-rays and thermal neutrons in the sample, respectively, and from this information the nitrogen content of the sample can be determined by reference to similar information from a set of standard samples and the corn meal protein content derived therefrom. In addition, for monitoring the behavior of the instrument, a conventional count rate meter 48 may be arranged to indicate visually the rate of receipt of pulses passed by the analyzer 41.

In order to correlate the information obtained in this manner, the apparatus is calibrated by measurement of a number of samples having a known nitrogen content varying throughout the expected range of unknown samples. Each set of unknown sample readings made thereafter with the apparatus in the same condition is readily converted to a determination of nitrogen content by comparison with this calibration. As an example of the accuracy and reproducibility of measurement obtainable by the use of apparatus arranged according to the invention, ninety-five percent of a group of measurements of a sample known to have a forty percent protein content yielded protein content determinations between 39.2 and 40.8 percent.

Inasmuch as the apparatus described above is highly sensitive to variations in voltage and must be maintained in precise alignment to assure maximum accuracy of measurement, equipment should be provided to simulate the signals which occur during a measurement. Therefore, a test pulse generator 49 is arranged in any well known manner to generate and transmit to the system pulse signals highly stable in amplitude and waveform which correspond to those occurring at various points in the circuit in response to the detection of gamma-rays of known energy. Frequent checking of the response of the apparatus in this manner assures optimum operation of the equipment, highly reliable determinations, and aids in adjustment and trouble shooting and also permits compensatory adjustments to eliminate changes in the 10.8 m.e.v. gamma-ray counting rate caused by instrumental drift.

In order to generate a pulse signal having an amplitude substantially proportional to the energy of the gamma-ray photons received, each of the detectors 24, 25, 26 and 27, as represented by the schematic illustration of the detector 24 in FIG. 4, includes a conventional photomultiplier tube 50 which may, for example, be of the type designated Dumont 6363. Positioned adjacent the light-receiving portion of the tube according to the usual scintillation counter arrangement is a thallium activated sodium iodide or cesium iodide crystal which may be cylindrical in shape, three inches long and three inches in diameter. Thus, the photosensitive cathode 51 of the tube is arranged to receive a light flash produced in the crystal in response to each incident gamma-ray having an intensity substantially proportional to the energy of the gamma-ray. The sodium iodide crystal should be suitably sheathed with a thermal neutron absorber such as boron carbide or other similar material so as to prevent thermal neutrons from being captured in the crystal, and producing capture gamma-rays which would then be detected as spurious counts. Also, in order to increase the proportion of gamma-rays counted to those emitted by the sample, it is possible to utilize a single large, liquid bath-type, or plastic scintillator substantially surrounding the sample chamber, with a plurality of photomultipliers 50 positioned to detect light flashes induced therein. These organic scintillators may also be layered, optically isolated from one another, and used in coincidence or anti-coincidence in various well-known ways so as to more effectively detect the desired 10.8 m.e.v. nitrogen gamma-rays and discriminate against fast neutron effects.

Electrons ejected from the cathode 51 by each light flash are multiplied by successive impingement on a series of dynodes 52 and accelerated toward a collector electrode 53, each dynode being supplied in the usual manner with a successively higher potential from voltage divider 54 arranged within the detector 24. Direct current voltage from a very stable high voltage positive source is applied to the positive side of the voltage divider and to the collector 53. In order to distinguish photomultiplier pulses which are closely spaced in time, a suitable pulse sharpener comprising a parallel choke 55 and diode 56, and a series resistor 57 is included in the collector circuit. Preferably, this circuit is adapted to generate a pulse of 0.04 microsecond duration in response to each light flash and, to this end, a typical circuit includes a two microhenry choke 55, a ten ohm resistor 57 and a fast acting diode 56 such, for example, as one of the type designated IN82A. In response to each flash of light, this circuit generates a pulse signal 58 having an amplitude $v$, proportional to the flash intensity, and therefore indicative of the energy of the incident gamma-ray, which is impressed on an output conductor 59 through a coupling capacitor 60.

In the illustrated example, with a collector electrode potential of about 1300 volts, the collector circuit generates a pulse having a maximum amplitude of approximately 200 millivolts in response to a 10.0 m.e.v. gamma-ray. In order to regulate the response of each photomultiplier 50 so that all the detectors produce signals of identical amplitude in response to gamma-rays of the same energy incident on the associated sodium iodide crystal, each cathode electrode 51 is connected to the movable tap 61 of a rheostat 62 connected between the negative side of the voltage divider 54 and ground. Inasmuch as the response of scintillation counters of the type described herein is sensitive to temperature variations, greatest accuracy of measurement is obtained when the water circulated through the jacket 21 maintains the temperature of the detectors 24, 25, 26 and 27 within one-tenth of a degree C. of a predetermined value.

Each pulse signal generated in the collector circuit tends to induce oscillation subsequent to the pulse, but the diode 56 and the resistor 57 rapidly damp out any response subsequent to the initial pulse, as illustrated by the waveform 58. In order to substantially block all pulse signals having an amplitude less than a predetermined value and thereby prevent the pileup effect described above, a fast acting diode 65 of the IN82A type connects the conductor 59 through a 500 microhenry coupling choke 66 and a conductor 67 to the preselector bias control 37. Shunting the conductor 59 to ground on the collector side of the diode 65, a choke 69 having a low D.C. resistance and 100 microhenries inductance and a 100 ohm resistor 70 connected in series present a high impedance to the pulse and a low impedance to the D.C. bias current for the diode 65, thus stabilizing the bias voltage across the diode, a similar function being performed by the choke 66. Inasmuch as the voltage applied by the bias control through the conductor 67 to the positive side of the diode 65 maintains the anode A of the diode 65 at a predetermined negative voltage with respect to the cathode K, pulses having amplitude less than this voltage are not passed by the diode. Any pulse of greater amplitude, however, is transmitted through a coupling capacitor 68 with an amplitude $v'$ equal to the differences between its original amplitude $v$ and the bias voltage. As a consequence, the lower pulse height portion of the pulse spectrum from the photomultiplier collector is not transmitted by the diode 65. Since most of the pulses generated are in the lower portion of the pulse height spectrum, none of the subsequent equipment in the system need be capable of handling pulses at above-normal rates. As a consequence of this particular feature, the following technique is made possible.

All the pulses transmitted by the diode 65 are lengthened by a conventional pulse stretcher 71 so that they are of sufficient duration (0.1–0.3 microsecond) to be amplified by the highly stable, but rather slow, conventional linear amplifier 40. After stretching, the pulses are fed through a conventional stacked cathode follower 72 of the well-known White type, for example, having a low input impedance and a suitable output impedance to match the transmission line 28 from the cathode follower 72 to the amplifier 40. Pulse signals carried from each of the preselectors 36 through the cables 28 are combined in the signal mixer 39 and transmitted to the amplifier 40. The mixer permits each cable 28, to feed into a high impedance and thus prevents the loss of signal amplitude that would result if the four cables 28 were connected together directly.

Figure 5:
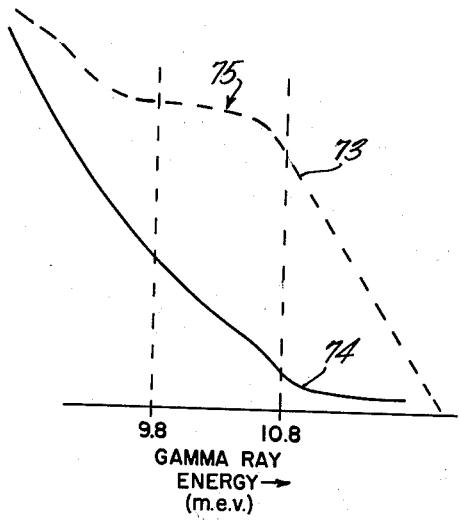
FIG. 5 is a graphical representation showing a typical distribution curve of pulse heights generated by apparatus constituting a particular embodiment of the invention in response to gamma-rays from a particular sample.

In determining the nitrogen content of a sample by measurement of the intensity of 10.8 m.e.v. gamma-rays emitted in response to neutron irradiation, the energy of the rays detected, as indicated by pulse amplitudes, usually has a distribution over a range somewhat greater than one m.e.v. because of minor variations in the response of the detecting apparatus to gamma-rays of the same energy. For example, identical flashes of light occurring in different positions in the sodium iodide crystal may strike the photosensitive cathode 51 with slightly differing intensities. Also, losses due to reflection of light and the like usually produce an indicated peak at an energy below the actual value. Further, the light flash intensity is not a unique, simple, or linear function of gamma-ray energy. For example, each 10.8 m.e.v. gamma-ray detected by the crystal can produce any one of three possible pulse heights, spaced the equivalent of 0.5 m.e.v. apart. In practice, the resulting three spectral peaks merge into one peak about one m.e.v. wide and located with its maximum at about 10.3 m.e.v. This is illustrated in FIG. 5 by the typical distribution curve 73 showing the indicated gamma-ray energies from a sample containing nitrogen and a typical distribution curve 74 representing gamma-rays from a sample containing no nitrogen. As illustrated thereby, the major portion of the 10.8 m.e.v. gamma-ray peak, designated 75, is distributed between indicated energies of 9.8 and 10.8 m.e.v.

Accordingly, the single channel pulse height analyzer 41, which provides an output pulse for each input pulse falling within a given amplitude range, is adjusted to produce a pulse for each input pulse corresponding to an indicated energy between 9.8 and 10.8 m.e.v. in order to make determinations of nitrogen content by 10.8 m.e.v. gamma-ray measurements. Inasmuch as the typical peak 75 is not sharply defined for the reasons mentioned above, it will be readily apparent that in order to obtain the desired accuracy of measurement the pulses generated by the photomultiplier 50 must be transmitted to the pulse height analyzer with high amplitude fidelity and all the components of the system should have maximum stability.

As previously described, the output pulses from the single channel pulse height analyzer are fed to the scaler 45 which accumulates a count of the number of pulses received by the analyzer 41 within the range 9.8 to 10.8 m.e.v. during the time interval determined by the clock 47. Inasmuch as the clock starts and stops both the scalers 45 and 46 simultaneously according to preselected time interval settings, characteristic gamma-ray intensity and neutron intensity data are provided for the determination of nitrogen content by comparison with the calibration.

In operation, a sample of corn meal to be analyzed for protein content is introduced into the chamber 14 through the hopper 12 so that the chamber is completely filled with sample material and the clock 47 is started, actuating the scalers 45 and 46. Fast neutrons from the source 12 enter the corn meal sample and are thermalized by collisions with the hydrogen and other light atoms therein and in the surrounding water so that the sample material in the chamber is irradiated by a large number of slow, or thermal, neutrons capable of capture by nitrogen atoms. As described above, the detector 34 responds in proportion to the slow neutron concentration in the sample and amplified pulse signals therefrom are accumulated by the scaler 46.

At the same time, slow neutrons are captured by atoms of nitrogen and other elements present in the corn meal and the atoms thus excited emit radiation of characteristic energy. Inasmuch as the thermal neutrons are captured and characteristic gamma-rays emitted by atoms of each element in proportion to its concentration in the sample, the detectors 24, 25, 26, and 27 receive 10.8 m.e.v. gamma-rays at a rate representative of the nitrogen content of the corn meal in the chamber and respond by transmitting pulses of substantially proportional amplitude.

After elimination of pulses generated by lower energy radiations in the preselectors 36, the pulse signals from all the detectors are combined in the mixer 39 and amplified without distortion of their relative amplitudes by the amplifier 40. Signals corresponding to gamma-ray energies within the range 9.8 to 10.8 m.e.v. are selected by the pulse height analyzer 41 to actuate the scaler 45 which thus accumulates a count representative of the number of gamma-rays detected which are characteristic of nitrogen. At the end of any predetermined time interval, the clock 47 blocks further recording of pulses by the scalers 45 and 46 and the nitrogen content of the sample is obtained from neutron and gamma-ray counts accumulated therein by comparison with the calibration of the apparatus, the protein content being calculated therefrom by a known relationship.

Although the invention has been described herein with reference to a specific embodiment, many modifications and variations therein will occur to those skilled in the art. Accordingly, the invention is not intended to be limited in scope except as defined by the following claims.

We claim:

1. A method for determining the content of an element responsive to neutron capture in a sample comprising the steps of irradiating the sample with neutrons, detecting the gamma radiations emitted by the sample with detectors positioned in at least two different locations in the sample and generating a pulse signal in response to each radiation detected having an amplitude proportional to the energy of the radiation, blocking all the pulse signals from each location corresponding to radiations having an energy below a predetermined value, then mixing the remaining pulse signals from all the detecting locations, selecting pulse signals corresponding to radiations having energy characteristic of a reaction of a neutron with an atom of the element, measuring the number of these pulse signals generated per unit time, and measuring the intensity of thermal neutrons in the sample.

2. A method for determining the content of an element responsive to neutron capture in a sample comprising the steps of intermittently irradiating the sample with neutrons, detecting the gamma radiations emitted by the sample with detectors positioned in at least two different locations in the sample and generating a pulse signal in response to each radiation detected having an amplitude proportional to the energy of the radiation, blocking all the pulse signals from each position corresponding to radiations having an energy below a predetermined value, then mixing the remaining pulse signals from all the detecting locations, selecting pulse signals corresponding to radiations having energy characteristic of a reaction of a neutron with an atom of the element, measuring the number of these pulse signals generated per unit time, and measuring the intensity of the thermal neutrons in the sample in the vicinity of the detecting locations.

3. Apparatus for determining the content of an element responsive to neutron capture in a sample comprising a chamber for holding the sample, a neutron source positioned to irradiate the sample, detecting means positioned at a plurality of locations about the sample, each responsive to gamma-rays emitted by the sample to generate a pulse signal having an amplitude substantially proportional to the energy of each gamma-ray detected, preselector means for blocking pulse signals from each location generated by gamma-rays having energy below a predetermined value, analyzer means responsive to pulse signals from the detecting means at all the locations having an amplitude corresponding to the energy of gamma-rays emitted by atoms of the element in response to neutron capture, means for counting the number of these pulse signals received by the analyzer means, and means for simultaneously measuring the intensity of thermal neutrons in the sample.

4. Apparatus for determining the content of an element responsive to neutron capture in a sample comprising a chamber for holding the sample, a neutron source arranged to irradiate the sample, detecting means positioned at a plurality of locations about the sample, each responsive to gamma-rays emitted by the sample to generate a pulse signal having an amplitude substantially proportional to the energy of each gamma-ray detected and a duration less than 0.1 microsecond, preselector means for blocking pulse signals from each of the locations generated by gamma-rays having energy below a predetermined value, pulse stretcher means for lengthening each pulse passed by the preselector means to a duration greater than 0.1 microsecond, analyzer means responsive to pulse signals from the stretcher means for each detecting location having a duration greater than 0.1 microsecond and having an amplitude corresponding to the energy of gamma-rays emitted by atoms of the element in response to neutron capture, and means for counting the number of these pulse signals received by the analyzer means.

5. Apparatus for determining the content of an element responsive to neutron capture in a sample comprising a chamber for holding the sample, a pulse neutron source arranged to irradiate the sample intermittently, detecting means positioned at a plurality of locations about the sample, each operative intermittently in timed relation to the neutron source and responsive to gamma-rays emitted by the sample to generate a pulse signal having an amplitude substantially proportional to the energy of each gamma-ray detected, preselector means for blocking pulse signals from each of the locations generated by gamma-rays having energy below a predetermined value, analyzer means responsive to pulse signals from the detecting means at each location having an amplitude corresponding to the energy of gamma-rays emitted by atoms of the element in response to neutron capture, means for counting the number of these pulse signals received by the analyzer means, and means for simultaneously measuring the intensity of thermal neutrons in the sample.

6. Apparatus for determining the content of an element sponsive to neutron capture in a sample comprising a chamber for holding the sample, a neutron source posisioned to irradiate the sample with high energy neutrons, detecting means spaced from the neutron source responsive to gamma-rays emitted by the sample to generate a pulse signal having an amplitude proportional to the energy of a detected gamma-ray, means for shielding the detecting means from a substantial portion of the high energy neutrons emitted by the radioactive means in the direction of the detecting means, jacket means surrounding the chamber including atoms of low atomic weight to moderate the neutrons, analyzer means responsive to pulse signals corresponding to gamma-rays emitted by atoms of the element upon capture of a neutron, means for counting the number of these pulse signals received by the analyzer means, and means for simultaneously measuring the intensity of thermal neutrons in the sample.

7. A method for determining the protein content of a sample of food comprising the steps of enclosing the sample of food, irradiating said sample with neutrons, detecting the radiations emitted by said sample and generating a pulse signal in response to each radiation detected having an amplitude representative of the energy of the radiation, blocking substantially all of the pulse signals having amplitude below 9 m.e.v., selecting the pulse signals corresponding to radiations having energy characteristic of neutron capture by nitrogen, counting the number of these pulse signals generated per unit time, and detecting the intensity of the neutrons available for capture in the sample.

8. A method for determining the chemical content of a bulk of fluent material comprising the steps of flowing a sample of said material about and between a source of neutrons and a plurality of radioactivity scintillation detectors angularly spaced thereabout to define a sample mass of fixed volume and configuration, summing the outputs of said detectors in response to capture gamma rays of predetermined energy range to obtain a total count representing the chemical content of said bulk of material, and simultaneously measuring the intensity of thermal neutrons in the sample.

9. A method for determining the chemical content of a bulk of fluent material comprising the steps of flowing a sample of said material about and between a source of neutrons and a plurality of radioactivity scintillation detectors angularly spaced therefrom to define a sample mass of fixed volume in a given spacial relation to said source and detectors, biasing said detectors to substantially reduce their response to neutrons from said source relative to their response to gamma rays resulting from capture of slow neutrons by a chemical element in said sample, summing the outputs of said detectors corresponding to a predetermined capture gamma energy range to obtain a total count representing the chemical content of said bulk of material, and simultaneously measuring the intensity of slow neutrons in the sample.

10. A method for determining the nitrogen content of a bulk of fluent material comprising the steps of flowing a sample of said material about and between a source of neutrons and a plurality of radioactivity scintillation detectors angularly spaced therefrom to define a sample mass of fixed volume in a given spacial relation to said source and detectors, biasing said detectors to substantially reduce their response to neutrons from said source relative to their response to gamma rays resulting from capture of slow neutrons by nitrogen in said sample, maintaining substantially constant the temperature of a neutron moderator surrounding said sample to stabilize the response of said detectors, and summing the outputs of said detectors corresponding to a predetermined capture gamma energy range to obtain a total count representing the nitrogen content of said bulk of material.

11. Apparatus for determining a sample's content of an element which emits gamma rays of characteristic energy upon capture of slow neutrons, comprising a chamber for receiving and defining the bounds of a sample containing such element, a neutron source and a plurality of gamma ray detectors extending into said chamber and supported thereby in angularly spaced relation with respect to said source, means for deriving indications of the sum of the gamma rays detected by said detectors within a predetermined energy range characteristic of capture gamma rays emitted by said element, and means for simultaneously measuring the intensity of thermal neutrons in the sample.

12. Apparatus for determining the content of an element responsive to neutron capture in a sample comprising a chamber for holding the sample, a neutron source positioned to irradiate the sample, detecting means positioned at a plurality of locations about the sample, each responsive to gamma rays emitted by the sample to generate a pulse signal having an amplitude substantially proportional to the energy of each gamma ray detected, preselector means for blocking pulse signals from each location generated by gamma rays having energy below a predetermined value, analyzer means responsive to pulse signals from the detecting means at all the locations having an amplitude corresponding to the pulse signals generated by gamma rays resulting from neutron capture by nitrogen nuclei and having an energy of approximately 10.8 m.e.v., and means for counting the number of these pulse signals received by the analyzer means.

13. Apparatus for determining the content of an element responsive to neutron capture in a sample comprising a chamber for holding the sample, a neutron source positioned to irradiate the sample with high-energy neutrons, detecting means spaced from the neutron source responsive to gamma rays emitted by the sample to generate a pulse signal having an amplitude proportional to the energy of a detected gamma ray, means for shielding the detecting means from a substantial portion of the high-energy neutrons emitted by the radioactive means in the direction of the detecting means, jacket means surrounding the chamber including atoms of low-atomic weight to moderate the neutrons, said jacket means being positioned with respect to the neutron source and the detecting means so that high-energy neutrons are moderated and captured by the atoms of low-atomic weight in said jacket with no sample in the chamber in sufficient quantity to produce a background radiation substantially equal to the total rate of pulse signals corresponding to gamma rays detected with a sample in the chamber, analyzer means responsive to pulse signals corresponding to gamma rays emitted by atoms of the element upon capture of a neutron, and means for counting the number of these pulse signals received by the analyzer means.

14. Apparatus for determining a sample's content of an element which emits gamma rays of characteristic energy upon capture of slow neutrons; comprising a chamber for receiving and defining the bounds of a sample containing such element; a neutron source and a plurality of gamma-ray detectors extending into said chamber and supported thereby in angularly spaced relation with respect to said source; a scattering cone for each of said detectors extending radially from said source in the direction of the corresponding detector but terminating short thereof and composed of high-atomic weight, high-density material having a low-thermal neutron capture cross section to minimize direct impingement of neutrons from said source upon said detectors; said cones being supported in said chamber in spaced relation to its walls and to one another to receive said sample thereabout; and means for deriving indications of the sum of the gamma rays detected by said detectors within a predetermined energy range characteristic of capture gamma rays emitted by said element.

References Cited in the file of this patent

UNITED STATES PATENTS

| | | |
|---|---|---|
| 2,099,185 | Adrian | Nov. 16, 1937 |
| 2,316,239 | Hare | Apr. 13, 1943 |
| 2,462,270 | Lipson | Feb. 22, 1949 |
| 2,506,944 | Stauffer et al. | May 9, 1950 |
| 2,596,080 | Raper et al. | May 6, 1952 |
| 2,648,012 | Scherbatskoy | Aug. 4, 1953 |
| 2,712,081 | Fearon et al. | June 28, 1955 |
| 2,744,199 | Juterbock et al. | May 1, 1956 |
| 2,752,504 | McKay | June 26, 1956 |
| 2,850,642 | Seevers | Sept. 2, 1958 |
| 2,867,728 | Pollock | Jan. 6, 1959 |
| 2,873,377 | McKay | Feb. 10, 1959 |
| 2,883,548 | Baker et al. | Apr. 21, 1959 |
| 2,884,529 | Eggler et al. | Apr. 28, 1959 |
| 2,903,590 | Somerville | Sept. 8, 1959 |
| 2,905,826 | Bonner et al. | Sept. 22, 1959 |
| 2,938,119 | McKay | May 24, 1960 |
| 2,948,810 | Caldwell et al. | Aug. 9, 1960 |
| 3,008,047 | Early et al. | Nov. 7, 1961 |
| 3,009,062 | Brooksbank et al. | Nov. 14, 1961 |
| 3,011,056 | Gale | Nov. 28, 1961 |
| 3,025,400 | Schultz | Mar. 13, 1962 |
| 3,053,388 | Tittle | Sept. 11, 1962 |

FOREIGN PATENTS

| | | |
|---|---|---|
| 724,441 | Great Britain | Feb. 23, 1955 |

OTHER REFERENCES

Cohen et al.: Bone Density Studies With a Gamma Gage, Radiation Research, June 1958, pages 509 to 515.